(12) United States Patent
Salandra

(10) Patent No.: US 11,578,951 B1
(45) Date of Patent: Feb. 14, 2023

(54) SHIELD HANDLE AND WALL MOUNT

(71) Applicant: Christian Joseph Salandra, Woodbine, MD (US)

(72) Inventor: Christian Joseph Salandra, Woodbine, MD (US)

( * ) Notice: Subject to any disclaimer, the term of this patent is extended or adjusted under 35 U.S.C. 154(b) by 0 days.

(21) Appl. No.: 17/405,056

(22) Filed: Aug. 18, 2021

(51) Int. Cl.
  *F41H 5/08* (2006.01)
  *F16B 11/00* (2006.01)

(52) U.S. Cl.
  CPC ............. *F41H 5/08* (2013.01); *F16B 11/006* (2013.01)

(58) Field of Classification Search
  CPC ........................................................ F41H 5/08
  See application file for complete search history.

(56) References Cited

U.S. PATENT DOCUMENTS

| | | | |
|---|---|---|---|
| 5,273,607 A * | 12/1993 | O'Scanlon | B32B 27/08 40/594 |
| 5,377,577 A | 1/1995 | Bounkong et al. | |
| 8,276,498 B1 | 10/2012 | Hannibal et al. | |
| 8,671,820 B1 | 3/2014 | Keyfauver et al. | |
| 9,090,116 B2 | 7/2015 | Tunis et al. | |
| 9,982,968 B2 | 5/2018 | Thomas | |
| 10,288,387 B1 * | 5/2019 | Marcum | F41H 5/08 |
| 10,480,907 B2 | 11/2019 | Klassen | |
| 10,823,534 B1 | 11/2020 | Johnson, Sr. | |
| 2007/0113731 A1 | 5/2007 | Mogensen | |
| 2010/0077912 A1 | 4/2010 | Smith et al. | |
| 2010/0101404 A1 | 4/2010 | Lorenzo et al. | |
| 2017/0268854 A1 * | 9/2017 | Spransy | F41H 5/08 |
| 2018/0372455 A1 * | 12/2018 | Klassen | G09F 15/0006 |
| 2019/0093991 A1 * | 3/2019 | Cryer | B32B 15/20 |

* cited by examiner

*Primary Examiner* — J. Woodrow Eldred
(74) *Attorney, Agent, or Firm* — Medier Ferro Woodhouse & Mills PLLC

(57) ABSTRACT

The present invention includes a shield having a shield portion and a handle, the handle comprising a wall mount that allows the shield to be hung on a wall. The handle is coupled to the shield portion at a first end portion and a second end portion. An outward bending portion is disposed between the first end portion and the second end portion that allows a user to hold the shield. The wall mount includes a slit configured to house the head of a nail or other hanging fixtures and enables the shield to be mounted on a wall.

21 Claims, 10 Drawing Sheets

SHIELD HANDLE AND WALL MOUNT

FIELD OF THE INVENTION

The present invention relates to a shield including a handle, and, more particularly, a shield with a handle that enables the shield to be hung on a wall.

BACKGROUND

Shields have been used throughout history as a piece of armor held in the hand that intercepts or blocks incoming threats during combat. In the 20th century, military use of shields is nearly non-existent aside from specialized units. Accordingly, the market reflects a need for commercialized shields, and more particularly, shields that are decorative and can be mounted or hung on a wall.

BRIEF SUMMARY OF THE INVENTION

In accordance with an aspect hereof, a shield having a handle that enables a user to hang the shield on a wall is disclosed. The shield includes a shield portion and a handle, the handle including a wall mount.

In one aspect, the present disclosure provides a shield comprising a shield portion, a handle including a first end portion coupled to the shield portion, an outward bending portion spaced from an interior surface of the shield portion, the outward bending portion being coupled to the first end portion, and a wall mount configured to enable the shield to be hung on a wall.

In another aspect hereof, and in combination with any other aspects, the disclosure provides the handle further comprises a second end portion coupled to the shield, wherein the outward bending portion is disposed between the first end portion and the second end portion of the handle.

In another aspect hereof, and in combination with any other aspects, the shield material comprises aluminum.

In another aspect hereof, and in combination with any other aspects, the handle may be attached to the shield using cold-weld epoxy.

In another aspect hereof, and in combination with any other aspects, the outward bending portion of the handle includes a covering.

In another aspect hereof, and in combination with any other aspects, a first bolt and a second bolt couple the covering to the outward bending portion of the handle, the first bolt secured adjacent to the first end portion of the handle and the second bolt secured adjacent to the second end portion of the handle.

In another aspect hereof, and in combination with any other aspects, adhesives, knots, and/or other mechanical connectors couple the covering to the outward bending portion of the handle.

In another aspect hereof, and in combination with any other aspects, the wall mount is coupled to the first end portion of the handle, the wall mount including a flat surface comprising a slit, a cavity disposed between the first end portion of the handle and the flat surface, and a first side section and a second side section that secure the flat surface to the first end portion of the handle.

In another aspect hereof, and in combination with any other aspects, the first end portion of the handle is bent at an angle of about 20-24° with respect to a baseline.

In another aspect hereof, and in combination with any other aspects, the second end portion of the handle is bent at an angle of about 23-27° with respect to a baseline.

In another aspect hereof, and in combination with any other aspects, a center portion of the outward bending portion of the handle extends about 2.55-2.68 inches from an interior surface of the shield portion.

In another aspect hereof, and in combination with any other aspects, the handle has a width of about 1.0-1.5 inches, a length of about 22-26 inches, and a thickness of about 0.1-0.25 inches.

In another aspect hereof, and in combination with any other aspects, the flat surface of the wall mount is a rectangular shape.

In another aspect hereof, and in combination with any other aspects, the flat surface further comprises a first edge, a second edge, a third edge, and a fourth edge.

In another aspect hereof, and in combination with any other aspects, the flat surface of the wall mount has a length of about 1.5-2.0 inches, a width of about 1.0-1.5 inches, and a thickness of about 0.8-1.0 inches.

In another aspect hereof, and in combination with any other aspects, the slit in the wall mount begins at a center of the first edge of the flat surface and extends towards a center of the second edge of the flat surface and has a length of about 0.75-1.25 inches and a width of about 0.1-0.4 inches.

In another aspect hereof, and in combination with any other aspects, the wall mount includes a slit disposed at a center portion of the outward bending portion of the handle, wherein the slit extends transverse to a longitudinal axis of the handle and extends towards a center of the second edge of the handle such that the handle is configured to be disposed horizontally when hung on a wall.

In another aspect hereof, and in combination with any other aspects, the first end portion and the second end portion of the handle are bent at an angle of about 20-24° with respect to a baseline.

In another aspect hereof, and in combination with any other aspects, the handle has a width of about 1.0-1.5 inches, a length of about 22-26 inches, and a thickness of about 0.1-0.25 inches.

In another aspect hereof, and in combination with any other aspects, the slit has a length of about 0.5-0.62 inches and a width of about 0.2-0.5 inches.

In another aspect hereof, and in combination with any other aspects, a center portion of the outward bending portion of the handle extends about 2.0-2.25 inches from the inner surface of the shield portion.

The details of one or more aspects of the disclosure are set forth in the accompanying drawings and the description below. Other features, objects, and advantages of the techniques described in this disclosure will be apparent from the description and drawings, and from the claims.

BRIEF DESCRIPTION OF DRAWINGS

The foregoing and other features and advantages of the present disclosure will be apparent from the following description of embodiments hereof as illustrated in the accompanying drawings. The accompanying drawings, which are incorporated herein and form a part of the specification, further serve to explain the principles of the present disclosure and to enable a person skilled in the pertinent art to make and use the embodiments of the present disclosure. The drawings may not be to scale.

DETAILED DESCRIPTION

Figure 1:
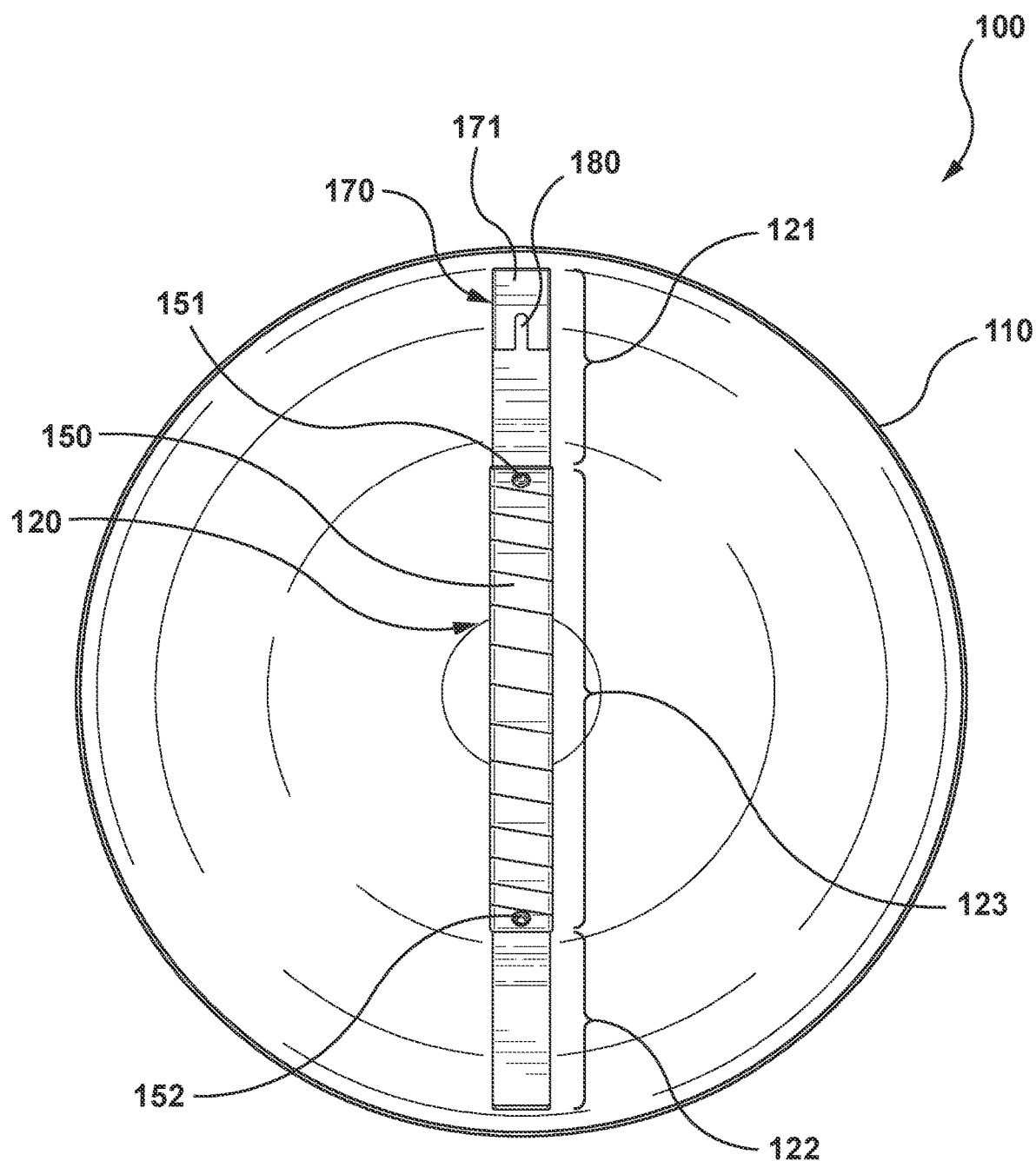
FIG. 1 shows a rear view of a shield according to embodiments hereof.

It should be understood that various embodiments disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the techniques). In addition, while certain aspects of this disclosure are described as being performed by a single device or component for purposes of clarity, it should be understood that the techniques of this disclosure may be performed by a combination of devices or components associated with, for example, a shield. The following detailed description is merely exemplary in nature and is not intended to limit the invention of the application and uses of the invention. Furthermore, there is no intention to be bound by any expressed or implied theory presented in the preceding field of the invention, background, summary or the following detailed description.

As used in this specification, the singular forms "a", "an" and "the" specifically also encompass the plural forms of the terms to which they refer, unless the content clearly dictates otherwise. The term "about" is used herein to mean approximately, in the region of, roughly, or around. When the term "about" is used in conjunction with a numerical range, it modifies that range by extending the boundaries above and below the numerical values set forth. In general, the term "about" is used herein to modify a numerical value above and below the stated value by a variance of 20%. It should be understood that use of the term "about" also includes the specifically recited number of value.

FIGS. 1-6 show a shield 100 according to embodiments herein. The shield 100 includes a shield portion 110 and a handle 120. The handle 120 includes a wall mount 170. In some embodiments, the shield portion 110 is a curved, circular piece of metal. The shield portion 110 may also be described as a portion of a sphere. The handle 120 may be an elongate piece of metal or other suitable material that includes a first end portion 121, a second end portion 122, and an outward bending portion 123. The handle 120 is coupled to an interior surface 111 of the shield portion 110 at the first end portion 121 and the second end portion 122. The term "outward bending" as used herein means that the bend is away from the surface of the shield portion 110. Thus, in the present embodiment, the handle 120 is coupled to the interior surface 111 of the shield portion 110, so the outward bending portion 123 bends away from the interior surface 111. The outward bending portion 123 of the handle 120 is disposed between the first end portion 121 and the second end portion 122 of the handle 120 and is configured to allow a user to hold the shield 100. In some embodiments, the wall mount 170 is configured such that the handle 120 is disposed vertically to mount the shield 100 on the wall such that when mounted, the first end portion 121 of the handle 120 is disposed vertically above the outward bending portion 123 and the second end portion 122 of the handle 120 is disposed vertically below the outward bending portion 123.

Figure 3:
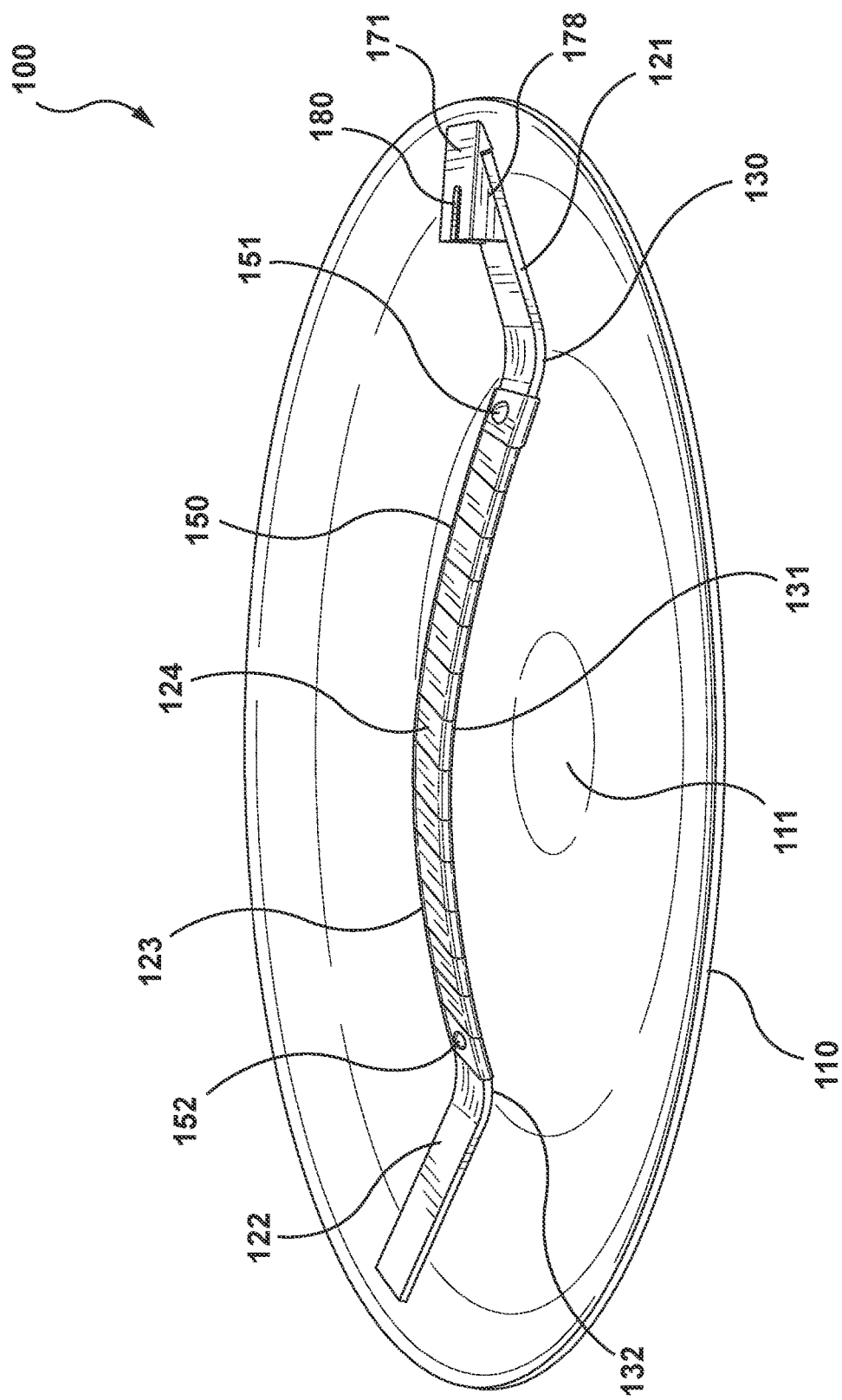
FIG. 3 shows a perspective side view of a shield according to embodiments hereof.
Figure 5A:
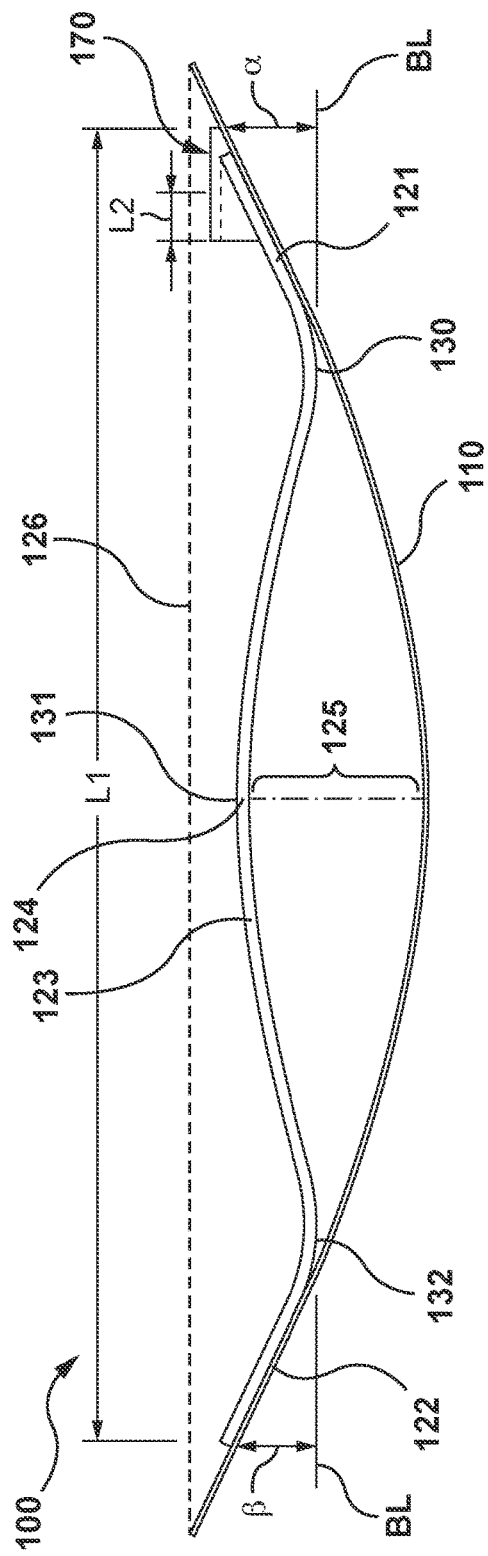
FIG. 5A shows a side view of a shield according to embodiments hereof.

As shown in FIGS. 3 and 5A, the handle 120 is bent in three locations; a first curved portion 130, a second curved portion 131, and a third curved portion 132. The first curved portion 130 couples the first end portion 121 to the outward bending portion 123. The second curved portion 131 is located at a center portion 124 of the outward bending portion 123. The third curved portion 132 couples the second end portion 122 and the outward bending portion 123. The first end portion 121 of the handle 120 is bent at an angle α of about 20°-24° degrees with respect to a baseline BL at the first curved portion 130 and the second end portion 122 of the handle 120 is bent at an angle β of about 23°-27° degrees with respect to the baseline BL at the third curved portion 132 in order for the first and second end portions 121, 122 to be flush against the curved interior surface 111 of the shield portion 110, as shown in FIG. 5A. The term "baseline" is used herein to describe a line parallel to a line from an edge of the shield portion to an opposite edge of the shield portion and parallel to handle if the handle did not include the curved portions. The ranges presented are examples only and can vary depending on the size and curvature of the shield portion 110 of the shield 100.

The center portion 124 of the outward bending portion 123 of the handle 120 is spaced a distance 125 of about 2.55-2.68 inches from the interior surface 111 of the shield portion 110, as shown in FIG. 5A. The distance 125 is sufficient such that a user may hold the shield 100 using the handle 120. In other words, the distance 125 is such that a user's hand and/or arm fits between the center portion 124 of the outward bending portion 123 of the handle 120 and the interior surface 111 of the shield portion 110. Further, in embodiments, the distance 125 is such that the center portion 124 of the outward bending portion 123 does not extend beyond the circumferential edge 126 of the shield portion 110, as can be seen in FIG. 5A, such that the circumferential edge 126 of the shield portion 110 will lay flush against a wall when the shield 100 is mounted to the wall.

Figure 5B:
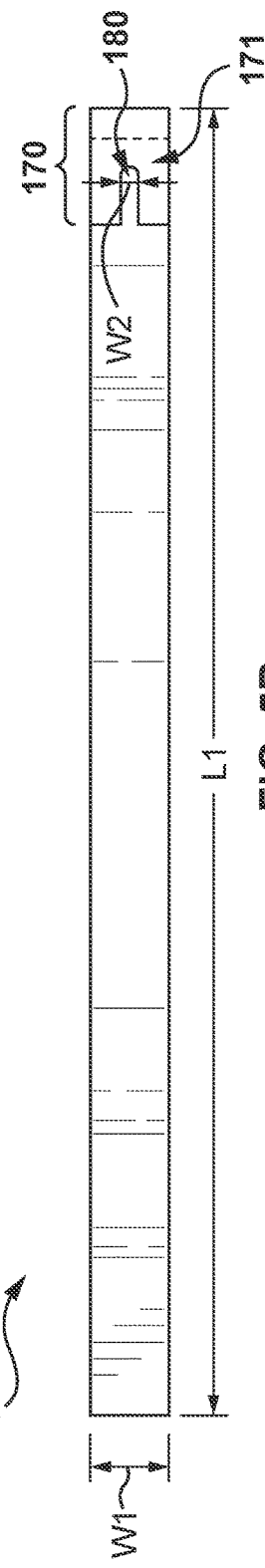
FIG. 5B shows a front view of a handle according to embodiments hereof.

In embodiments, the handle 120 may be coupled to the interior surface 111 of the shield portion 110 at the first end portion 121 and the second end portion 122 using cold-weld epoxy. However, this is not meant to be limiting, and other coupling mechanisms may be used, such as mechanical connectors (screws, rivets, etc.), adhesives, welding, and other coupling mechanism known to those skill in the art. In some embodiments, the handle 120 has a width W1 of about 1.0-1.5 inches, a length L1 of about 22-26 inches, and a thickness T1 of about 0.1-0.25 inches, as shown in FIG. 5B. However, this is not meant to be limiting, and the dimensions of the handle 120 may vary depending on various factors, such as but not limited to, the size and weight of the shield.

Figure 2:
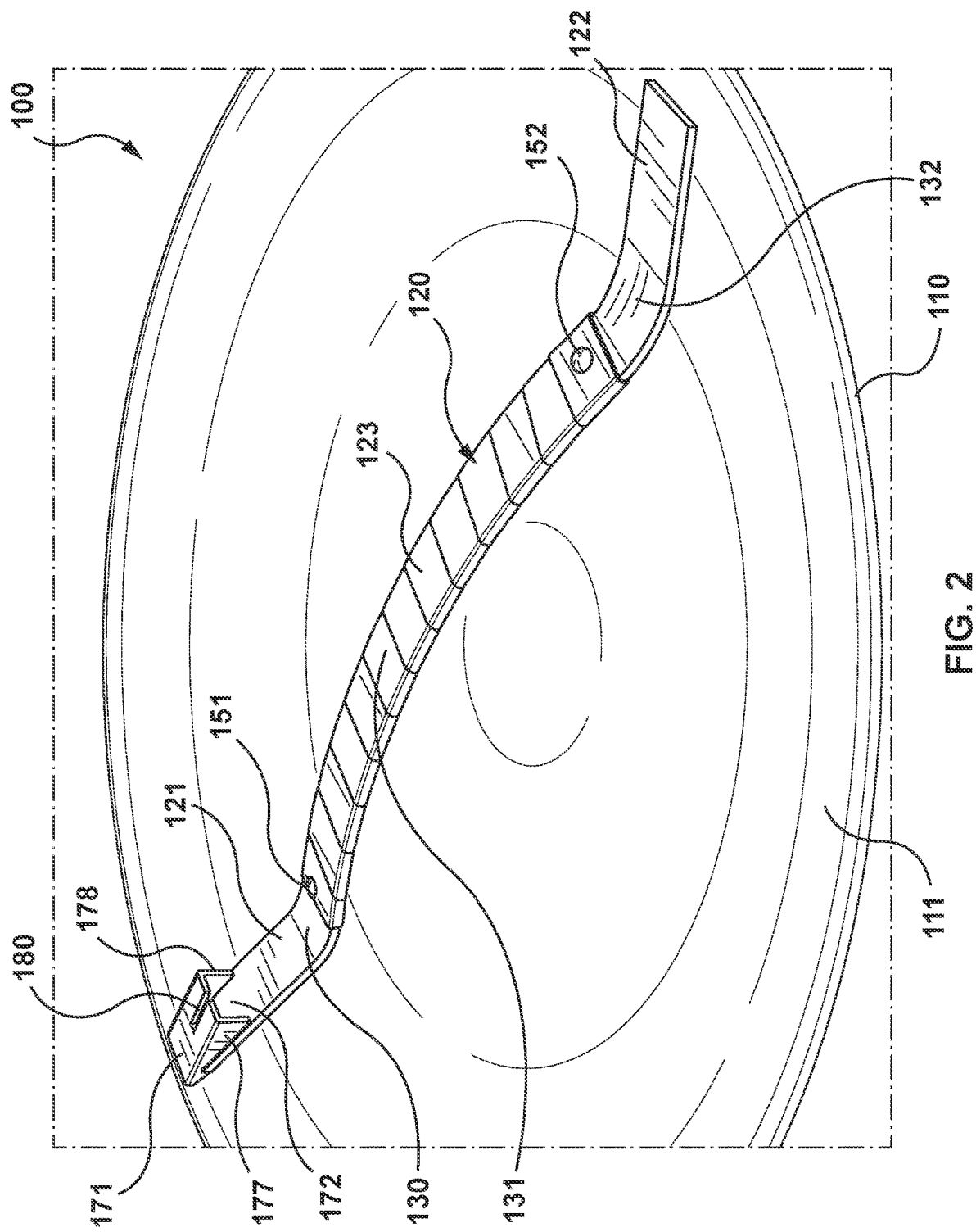
FIG. 2 shows a perspective rear view of a shield according to embodiments hereof.
Figure 4:
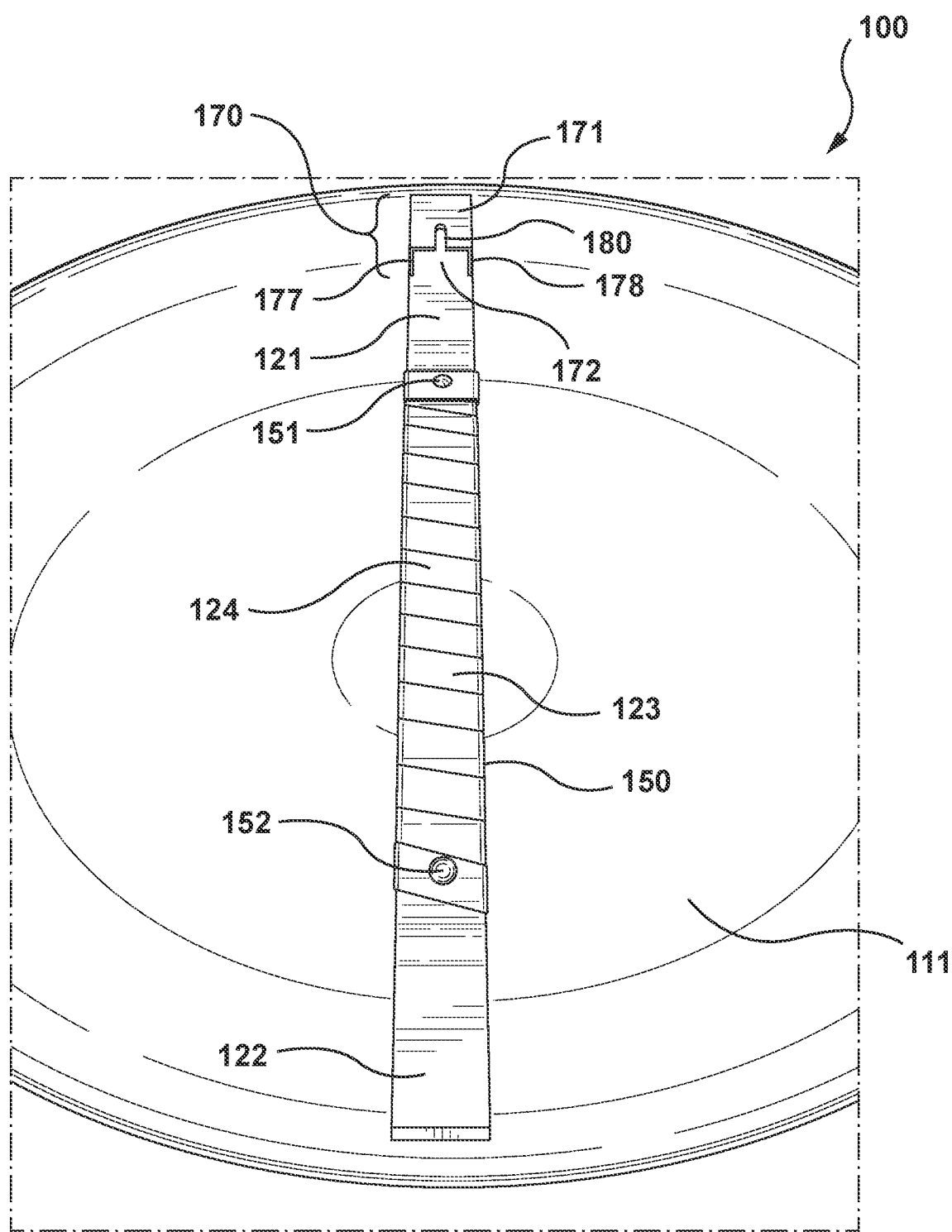
FIG. 4 shows a perspective rear view of a shield according to embodiments hereof.
Figure 6:
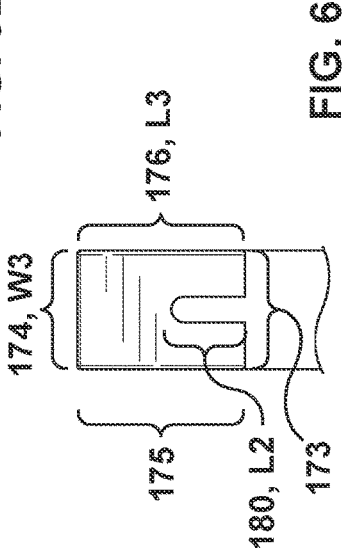
FIG. 6 shows a close-up view of a wall mount according to embodiments hereof.

In some embodiments, the wall mount 170 is coupled to the first end portion 121 of the handle 120. The wall mount 170 includes a flat surface 171, a cavity 172 disposed between the flat surface 171 and the first end portion 121 of the handle 120, a first side section 177, a second side section 178, and a slit 180 as shown in FIG. 2. The flat surface 171 of the wall mount 170 may be a flat, rectangular piece of metal that includes a first edge 173, a second edge 174, a third edge 175 and a fourth edge 176, as shown in FIG. 6. The first side section 177 and the second side section 178 of the wall mount 170 may be triangular-shaped pieces of metal. The side sections (177, 178) are configured to couple the flat surface 171 to the first end portion 121 of the handle 120, as shown in FIG. 2, and to space the flat surface 171 from the first end portion 121, thereby forming the cavity 172. The first side section 177 of the wall mount 170 is coupled to the third edge 175 of the flat surface 171 and the first end portion 121 of the handle 120. The second side section 178 is coupled to the fourth edge 176 of the flat surface 171 and the first end portion 121 of the handle 120. The cavity 172 is a hollow area defined within the flat surface 171, the first side section 177, the second side section 178, and the first end portion 121 of the handle 120, as shown in FIG. 4. The side sections 177, 178 may be coupled to the first end portion 121 and the flat surface 171 via welding, adhesives, or other suitable coupling mechanisms. Further, in other embodiments, the wall mount 170 may be formed integral with the handle 120.

The flat surface 171 of the wall mount 170 further includes a slit 180 configured to house the head of a nail or other hanging fixture that enables the shield 100 to be hung on a wall. The slit 180 may be a straight line cut-out in the flat surface 171 that begins at a center of the first edge 173 of the flat surface 171 and extends towards a center of the second edge 174 of the flat surface 171, as shown in FIG. 6. The slit 180 extends through an entire thickness of the flat surface 171, as shown in FIGS. 2 and 4. The slit 180 may have a length L2 of about 0.75-1.25 inches and a width W2 of about 0.1-0.4 inches. The flat surface 171 of the wall mount 170 may have a length L3 of about 1.5-2.0 inches, a width W3 of about 1.0-1.5 inches, and a thickness T3 of about 0.8-1.0 inches, as shown in FIG. 6. The ranges presented are examples only and can vary depending on the size and shape of the shield portion 110 of the shield 100.

In some embodiments, the handle 120 includes a covering 150 that is wrapped around and coupled to the outward bending portion 123 of the handle 120. The covering 150 is configured to support the grip of the user when the shield 100 is being held, as shown in FIG. 1. The center portion 124 of the outward bending portion 123 of the handle 120 in some embodiments may also rest against the wall when the shield 100 is hung. In such embodiments, the covering 150 also protects the wall from damage when the shield 100 is hung. The covering 150 may be secured to the outward bending portion 123 of the handle 120 by a first bolt 151 and a second bolt 152. The first bolt 151 and the second bolt 152 may extend through the covering 150 and the entire thickness of the handle 120. The first bolt 151 may be coupled to the outward bending portion 123 adjacent to the first curved portion 130 of the handle 120, and the second bolt 152 may be coupled to the outward bending portion 123 adjacent to the third curved portion 132 of the handle 120, as shown in FIG. 3. However, this is not meant to be limiting. In other embodiments, the covering 150 may be coupled to the outward bending portion 123 of the handle 120 by adhesives, knots, other mechanical connectors, or other connectors known to those skilled in the art. The covering 150 may be cloth, grip tape, rope, rubber, and/or other suitable materials and/or any combination thereof.

Figure 7:
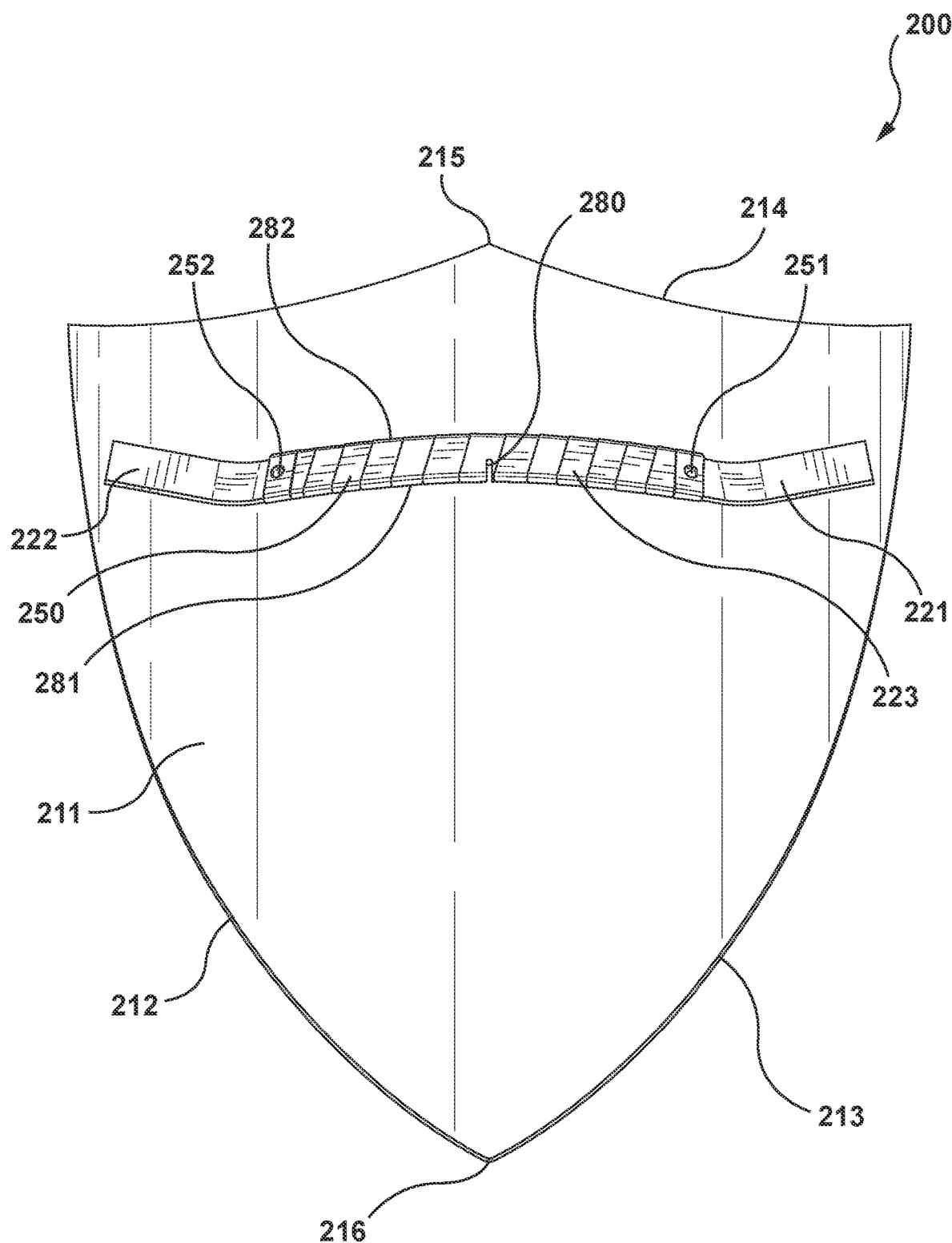
FIG. 7 shows a rear view of a shield according to embodiments hereof.
Figure 8:
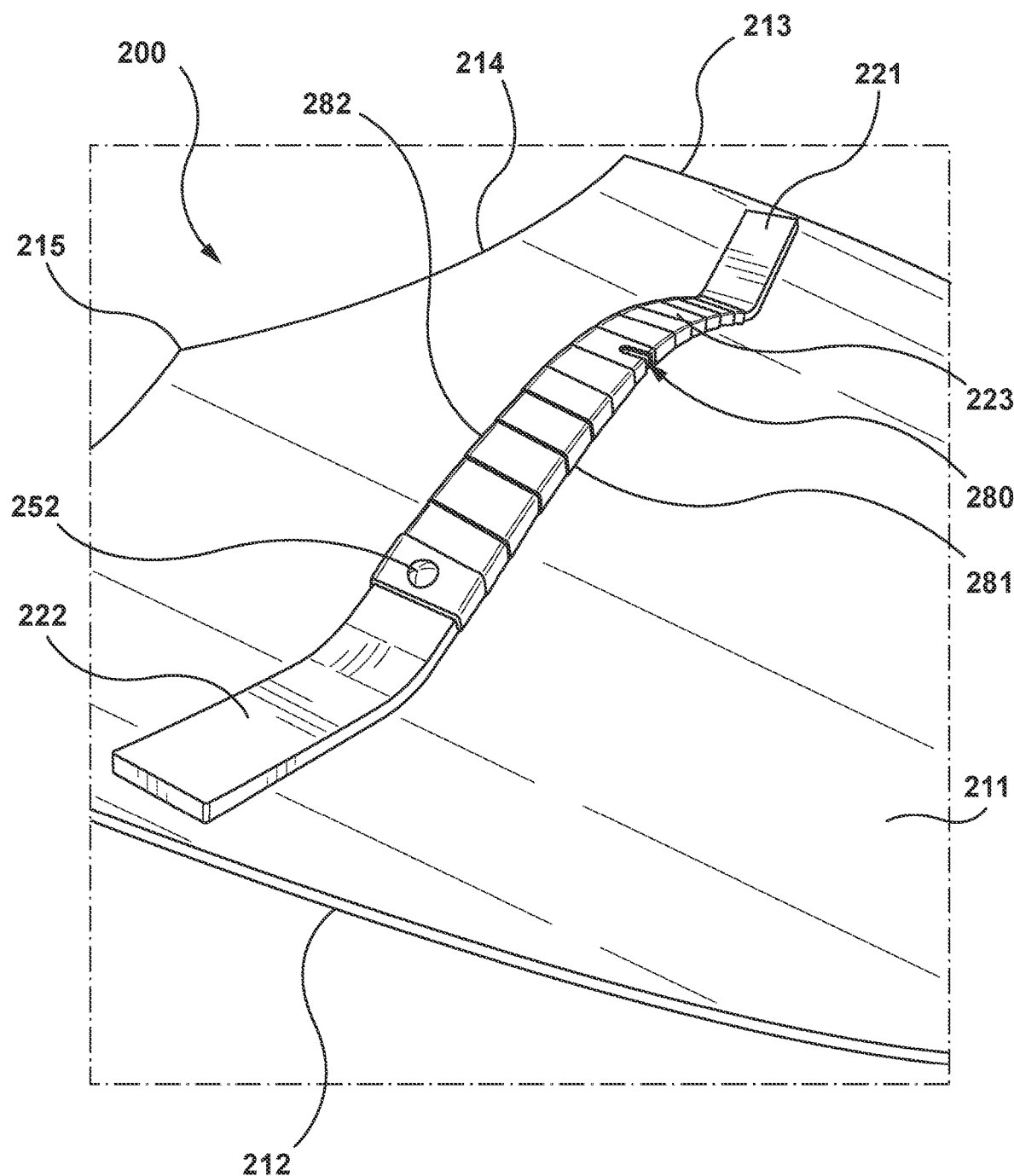
FIG. 8 shows a perspective side view of a shield according to embodiments hereof.
Figure 9:
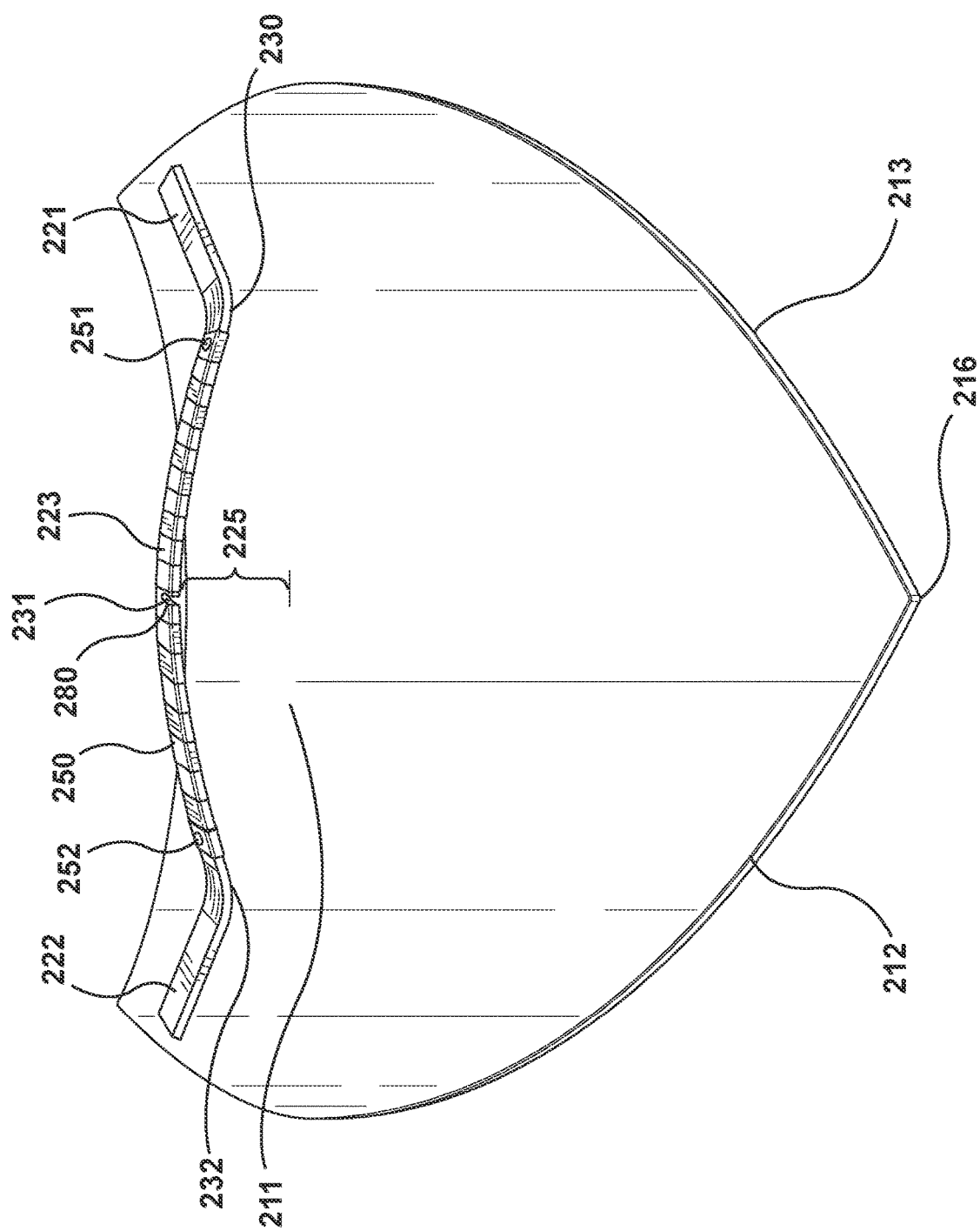
FIG. 9 shows a perspective rear view of a shield according to embodiments hereof.

FIGS. 7-9 show a shield 200 according to embodiments herein. The shield 200 includes a shield portion 210 and a handle 220. The handle includes a wall mount 270. In this embodiment, the shield portion 210 of the shield 200 is what is known to one skilled in the art as a medieval or renaissance shaped piece of metal. In other words, the shield portion is generally triangular in overall shape, with two side edges 212, 213 of the triangle curved and the third side edge 214, which is generally oriented as the top side, including an apex 215. However, this shape is not meant to be limiting. In embodiments, the handle 220 may be oriented such that with a point 216 where the two curved side edges 212, 213 meet oriented vertically downward and the apex 215 oriented vertically upward, with the handle 220 oriented horizontally between the first side edge 212 and the second side edge 213. The handle 220 may be an elongate piece of metal or other suitable material that includes a first end portion 221, a second end portion 222, an outward bending portion 223, a first edge 281, and a second edge 282. The handle 220 may be coupled to an interior surface 211 of the shield portion 210 at the first end portion 221 and the second end portion 222. The outward bending portion 223 of the handle 220 may be disposed between the first end portion 221 and the second end portion 222 of the handle 220 and is configured to allow a user to hold the shield 200.

Figure 10A:
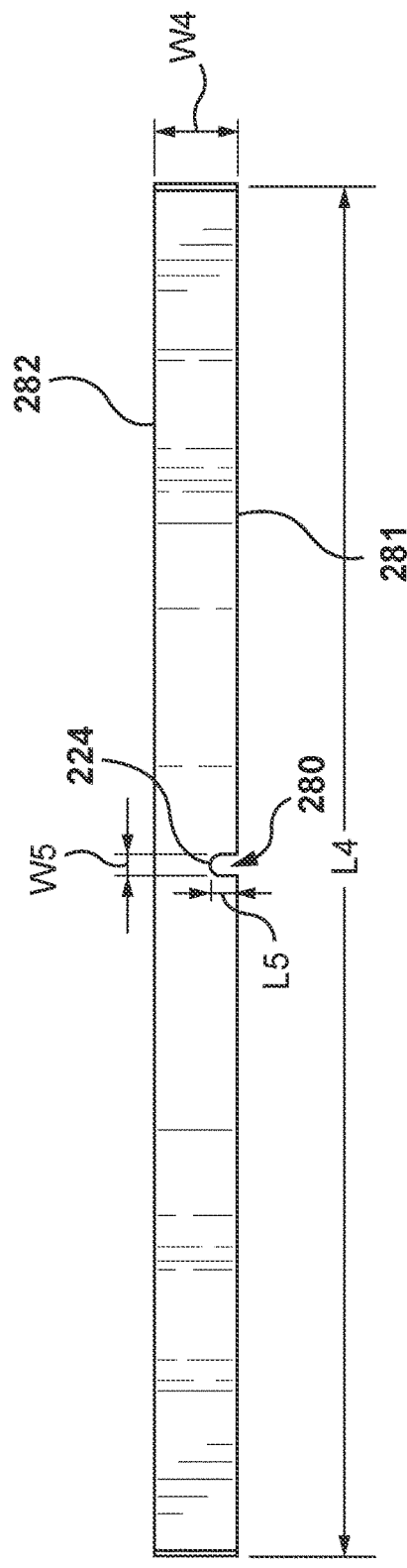
FIG. 10A shows a front view of a handle according to embodiments hereof.
Figure 10B:
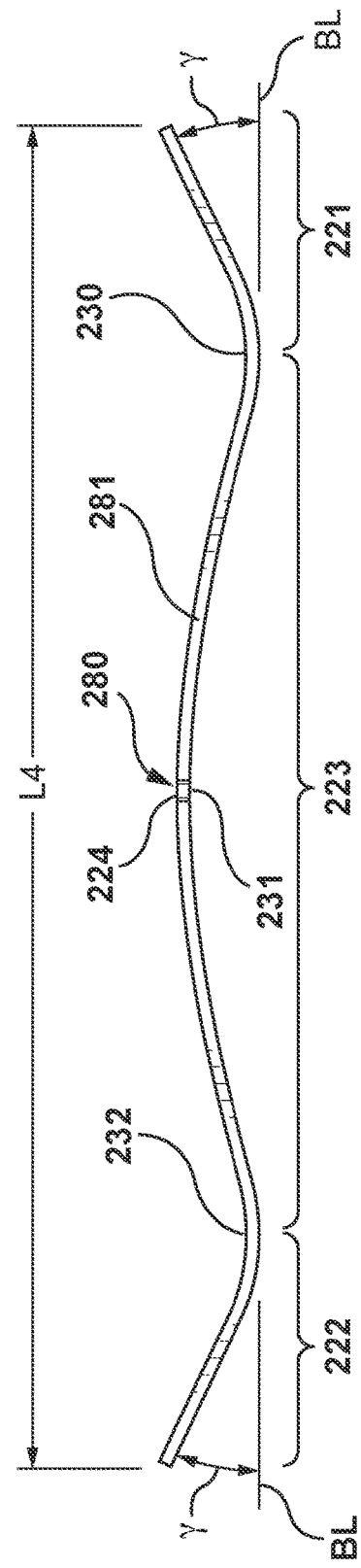
FIG. 10B shows a side view of a handle according to embodiments hereof.

As shown in FIGS. 9 and 10B, the handle 220 may be bent in three locations; a first curved portion 230, a second curved portion 231, and a third curved portion 232. The first curved portion 230 couples the first end portion 221 to the outward bending portion 223. The second curved portion 231 is located at a center portion 224 of the outward bending portion 223. The third curved portion 232 couples the second end portion 222 and the outward bending portion 223. As shown in FIG. 10B, the first end portion 221 and the second end portion 222 of the handle 220 may be bent at an angle γ of about 20°-24° degrees at the first and third curved portions 230, 232 with respect to the baseline BL in order to be flush against the curved interior surface 211 of the shield portion 210, as shown in FIG. 10B. The ranges presented are examples only and can vary depending on the size and curvature of the shield portion 210 of the shield 200.

The center portion 224 of the outward bending portion 223 of the handle 220 may be spaced a distance 225 of about 2.0-2.25 inches from the interior surface 211 of the shield portion 210, as shown in FIG. 9. The distance 225 is sufficient such that a user may hold the shield 200 using the handle 220. In other words, the distance 225 is such that a user's hand and/or arm fits between the center portion 224 of the outward bending portion 223 of the handle 220 and the interior surface 211 of the shield portion 210.

In embodiments, the handle 220 may be coupled to the interior surface 211 of the shield portion 210 at the first end portion 221 and the second end portion 222 using cold-weld epoxy. However, this is not limiting, and other coupling mechanisms can be used, such as mechanical connectors (screws, rivets, etc.), adhesives, welding, and other coupling mechanisms known to those skilled in the art. In some embodiments, the handle 220 has a width W4 of about 1.0-1.5 inches, a length L4 of about 22-26 inches, and a thickness T4 of about 0.1-0.25 inches, as shown in FIG. 10A. However, this is not meant to be limiting, and the dimensions of the handle 220 may vary depending on various factors, such as but not limited to, the size and weight of the shield.

Figure 11:
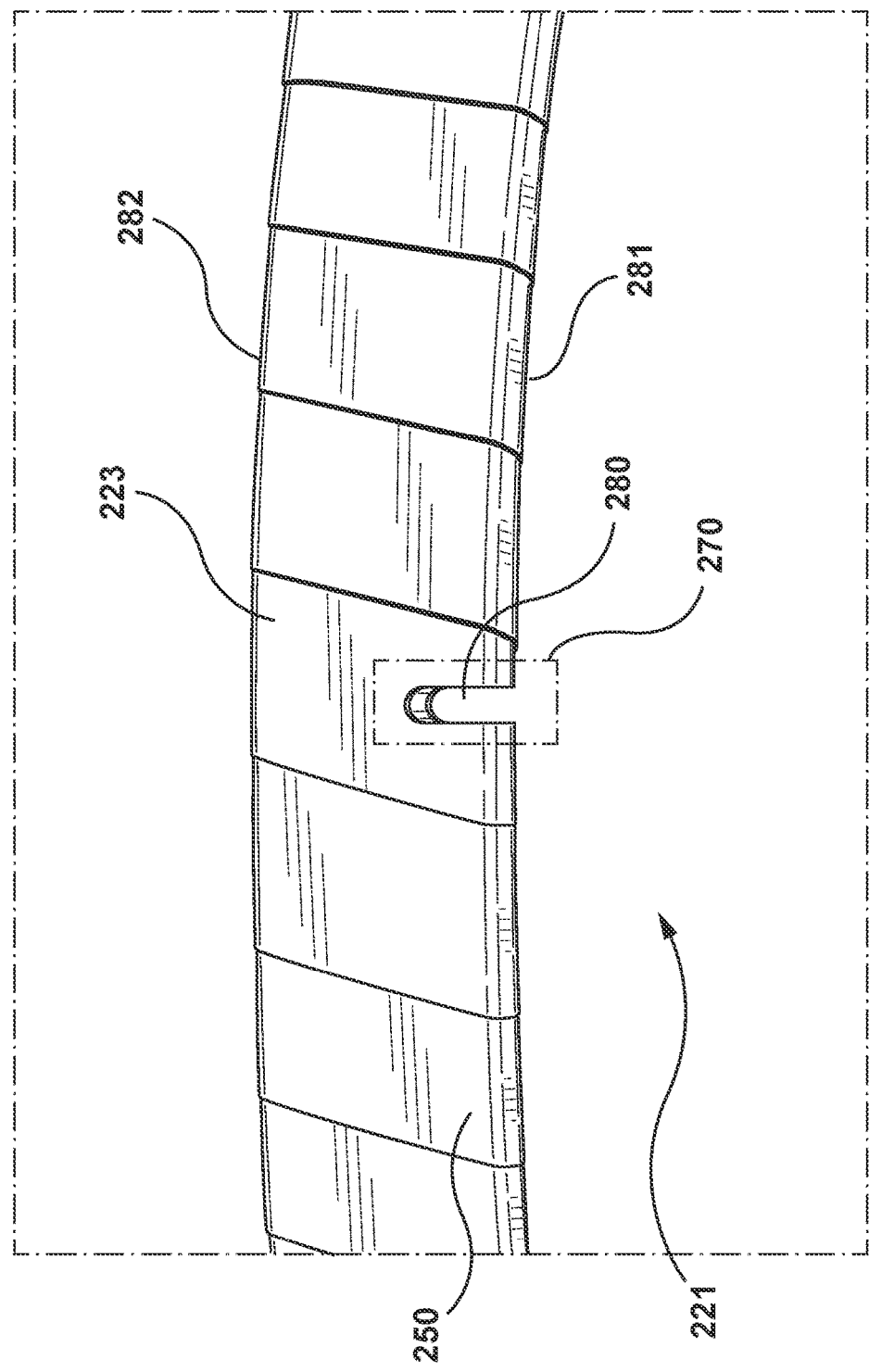
FIG. 11 shows a close up view of a wall mount according to embodiments hereof.

As shown in FIGS. 7-11, the first edge 281 and the second edge 282 of the handle 220 describe the parallel, elongate edges of the handle 220. In this embodiment, the wall mount 270 of the shield 200 includes a slit 280 disposed at the center portion 224 of the outward bending portion 223 of the handle 220. As shown in FIGS. 10A-10B, the slit 280 may be a straight line cut-out that begins at the first edge 281 of the handle 220 and extends towards the second edge 282 of the handle 220 at the center portion 224 of the outward bending portion 223 of the handle 220. In other words, the slit extends transverse to a longitudinal axis of the handle. The slit 280 extends through the covering 250 and the entire thickness of the outward bending portion 223 of the handle 220, as can be seen in FIG. 11. The slit 280 is configured to house the head of a nail or other hanging fixture that enables the shield 200 to be hung on a wall. The slit 280, as shown in FIG. 10A, has a length L5 of about 0.5-0.62 inches and a width W5 of about 0.2-0.5 inches.

In this embodiment, the slit 280 of the wall mount 270 is configured such that the second edge 282 of the handle 220 is disposed vertically above the first edge 281 of the handle 220 when the shield 200 is hung on a wall, as shown in FIG. 7. When the shield 200 is mounted on a wall using the slit 280 at the center portion 224 of the outward bending portion 223 of the handle 220, the first end portion 221 and the second end portion 222 of the handle 220 are disposed horizontally on opposite sides of the outward bending portion 223.

It should be understood that various embodiments disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the techniques). In addition, while certain aspects of this disclosure are described as being performed by a single device or component for purposes of clarity, it should be understood that the techniques of this disclosure may be performed by a combination of devices or components.

What is claimed is:

1. A shield comprising:
    a shield portion; and
    a handle including:
        a first end portion coupled to the shield portion;
        an outward bending portion spaced from an interior surface of the shield portion, the outward bending portion being coupled to the first end portion; and
        a wall mount configured to enable the shield to be hung on a wall, the wall mount comprising a slit.

2. The shield of claim 1, wherein the handle further comprises a second end portion coupled to the shield, wherein the outward bending portion is disposed between the first end portion and the second end portion of the handle.

3. The shield of claim 1, wherein the shield material comprises aluminum.

4. The shield of claim 1, wherein the handle is attached to the shield using cold-weld epoxy.

5. The shield of claim 1, wherein the outward bending portion of the handle includes a covering.

6. The shield of claim 5, further comprising a first bolt and a second bolt coupling the covering to the outward bending portion of the handle, the first bolt secured adjacent to the first end portion of the handle and the second bolt secured adjacent to the second end portion of the handle.

7. The shield of claim 5, further comprising adhesives, knots, and/or other mechanical connectors coupling the covering to the outward bending portion of the handle.

8. The shield of claim 1, wherein the wall mount is coupled to the first end portion of the handle, the wall mount further including:
    a flat surface comprising the slit;
    a cavity disposed between the first end portion of the handle and the flat surface; and
    a first side section and a second side section that secure the flat surface to the first end portion of the handle.

9. The shield of claim 8, wherein the first end portion of the handle is bent at an angle of about 20-24° with respect to a baseline.

10. The shield of claim 9, wherein the handle further comprises a second end portion coupled to the shield, wherein the outward bending portion is disposed between the first end portion and the second end portion of the handle, and wherein the second end portion of the handle is bent at an angle of about 23-27° with respect to a baseline.

11. The shield of claim 8, wherein a center portion of the outward bending portion of the handle extends about 2.55-2.68 inches from an interior surface of the shield portion.

12. The shield of claim 8, wherein the handle has a width of about 1.0-1.5 inches, a length of about 22-26 inches, and a thickness of about 0.1-0.25 inches.

13. The shield of claim 8, wherein the flat surface of the wall mount is a rectangular shape.

14. The shield of claim 8, wherein the flat surface further comprises a first edge, a second edge, a third edge, and a fourth edge.

15. The shield of claim 8, wherein the flat surface of the wall mount has a length of about 1.5-2.0 inches, a width of about 1.0-1.5 inches, and a thickness of about 0.8-1.0 inches.

16. The shield of claim 8, wherein the slit in the wall mount begins at a center of the first edge of the flat surface and extends towards a center of the second edge of the flat surface and has a length of about 0.75-1.25 inches and a width of about 0.1-0.4 inches.

17. The shield of claim 1, wherein the slit is disposed at a center portion of the outward bending portion of the handle and extends transverse to a longitudinal axis of the handle such that the handle is configured to be disposed horizontally when the shield is hung on a wall.

18. The shield of claim 17, wherein the handle further comprises a second end portion coupled to the shield, wherein the outward bending portion is disposed between the first end portion and the second end portion of the handle, and wherein the first end portion and the second end portion of the handle are bent at an angle of about 20°-24° with respect to a baseline.

19. The shield of claim 17, wherein the handle has a width of about 1.0-1.5 inches, a length of about 22-26 inches, and a thickness of about 0.1-0.25 inches.

20. The shield of claim 17, wherein the slit has a length of about 0.5-0.62 inches and a width of about 0.2-0.5 inches.

21. The shield of claim 17, wherein a center portion of the outward bending portion of the handle extends about 2.0-2.25 inches from the inner surface of the shield portion.

* * * * *